US006853470B2

(12) United States Patent
Takakubo (10) Patent No.: US 6,853,470 B2
(45) Date of Patent: Feb. 8, 2005

(54) SCANNING OPTICAL SYSTEM (75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/697,163

(22) Filed: Oct. 31, 2003

(65) Prior Publication Data
US 2004/0090658 A1 May 13, 2004

(30) Foreign Application Priority Data

Nov. 5, 2002 (JP) ........................................ 2002-320688

(51) Int. Cl.$^7$ ............................................. G02B 26/08
(52) U.S. Cl. ...................................................... 359/204
(58) Field of Search ................................. 359/204, 205, 359/206, 207, 216, 217, 218, 219; 347/244

(56) References Cited

U.S. PATENT DOCUMENTS 5,646,767 A   7/1997  Iima et al.
5,715,078 A * 2/1998  Shiraishi .................... 359/204

FOREIGN PATENT DOCUMENTS

JP    5-346553    12/1993
JP    7-230051    8/1995

* cited by examiner

Primary Examiner—Euncha P. Cherry
(74) Attorney, Agent, or Firm—Greenblum & Bernstein, P.L.C.

(57) ABSTRACT

According to an aspect of the present invention, there is provided a scanning optical system, which is provided with a light source that emits a plurality of beams, a deflector that simultaneously deflects the plurality of beams incident thereon, and an imaging optical system having a scanning lens and compensation lenses. Each of the compensation lenses has a lens surface whose optical surface reference axis is tilted with respect to an optical surface reference axis of the scanning lens. At least one of lens surfaces of each of the compensation lenses is formed to be an aspherical surface defined by a two-dimensional polynomial expression.

8 Claims, 7 Drawing Sheets

SCANNING OPTICAL SYSTEM

BACKGROUND OF THE INVENTION

The present invention relates to a scanning optical system for forming a laser beam scanning on a scan target surface.

In general, a scanning optical system is employed in, for example, a laser beam printer, a digital copying machine, a laser fax machine and a laser plotter. In such an apparatus, the scanning optical system is used to form a modulated beam scanning on the scan target surface (e.g., a photoconductive drum).

The scanning optical system is generally provided with a polygonal mirror which dynamically deflects laser beams on/off modulated according to image data, and an imaging optical system which converges the deflected laser beam on the scan target surface to form a beam spot scanning in a main scanning direction at a constant speed. Consequently, a two dimensional latent image is formed on the scan target surface.

Hereafter, a direction in which the beam spot is scanned on the scan target surface is referred to as the main scanning direction, and a direction perpendicular to the main scanning direction is referred to as an auxiliary scanning direction. In the following description, the shape of optical elements, directions of power of the optical elements and the like are described with reference to the main and auxiliary scanning directions on the surface to be scanned. That is, if an optical element is described to have a refractive power in the main scanning direction, the power affects the beam in the main scanning direction on the scan target surface regardless of the orientation of the element.

To remove ghost images due to undesired reflections is important design requirements of the scanning optical system. As mentioned below, such undesired reflections are caused by lens surfaces of the imaging optical system.

Part of a beam is reflected by a lens surface of the imaging optical system when the beam passes through the lens surface. The part of the beam (i.e., a reflected beam) proceeds in a direction defined depending on an incident angle a beam axis of the beam incident on the lens surface and on a shape of the lens surface. If the reflected beam impinges on one of reflective surface of the polygonal mirror, the reflected beam is reflected by the polygonal mirror again.

If a reflective surface on which the reflected beam impinges is coincides with a reflective surface currently deflecting the beam from a light source, the reflected beam twice deflected by the polygonal mirror does not enter the imaging optical system because the twice deflected beam proceeds toward the light source. That is, in this case, the reflected beam does not impinge on the scan target surface and therefore imaging quality is not deteriorated.

On the other hand, if the reflected beam impinges on a reflective surface neighboring a reflective surface currently deflecting the beam from the light source, the reflected beam twice deflected by the polygonal mirror may enter the imaging optical system. Therefore, there is a possibility that the photoconductive drum is exposed to undesired beams. If the photoconductive drum is exposed to the undesired beams, imaging quality is deteriorated. In this specification, such an undesired beam (i.e., the reflected beam) which impinges the polygonal mirror again is referred to as a ghost beam.

Figure 9:
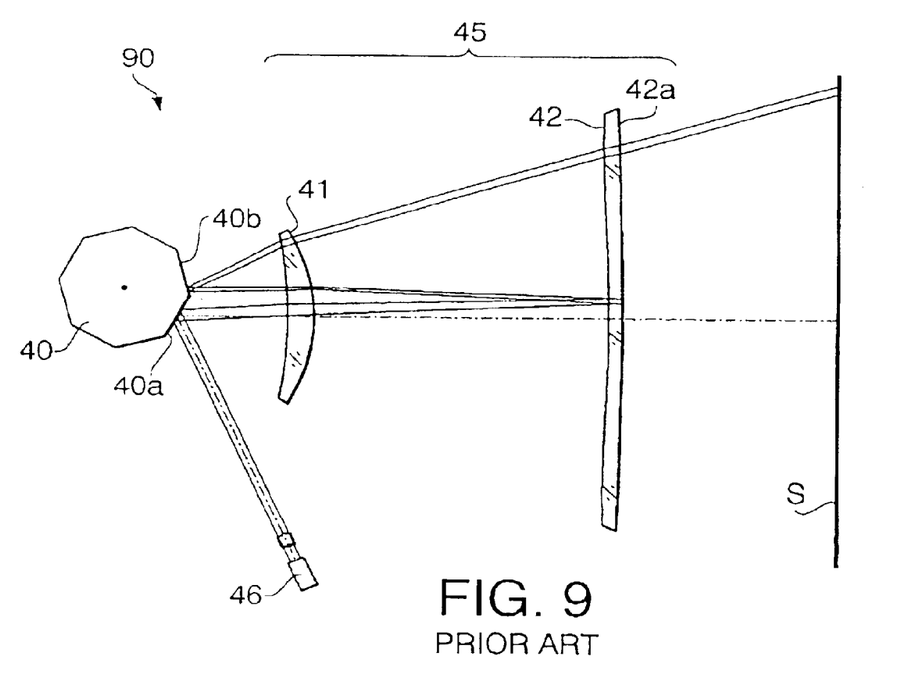
FIG. 9 is a top view of a conventional scanning optical system used for a monochrome laser beam printer.
Figure 10:
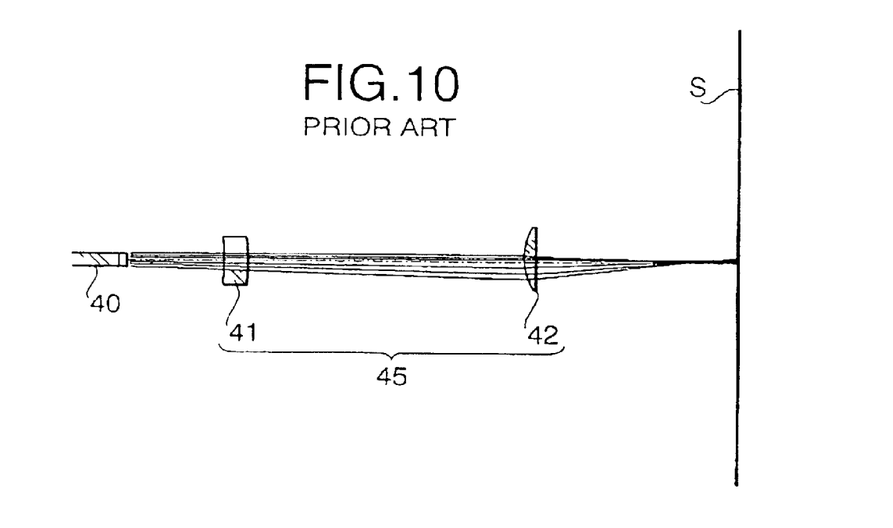
FIG. 10 is a side view of the scanning optical system shown in FIG. 9.

FIG. 9 is a top view of a conventional scanning optical system 90 used for a monochrome laser beam printer. FIG. 10 is a side view of the scanning optical system 90. As shown in FIG. 9, the scanning optical system 90 includes a light source 46, a polygonal mirror 40 and an fθ lens 45. The fθ lens 45 has a scanning lens 41 and a compensation lens 42.

The scanning lens 41 has power mainly in the main scanning direction and is located on a polygonal mirror side. The compensation lens 42 has the function of compensating for curvature of field and an fθ error and is located on a scan target surface side.

An optical path of a ghost beam is also indicated in FIGS. 9 and 10. Each of FIGS. 9 and 10 shows a situation where part of a beam passing through the compensation lens 42 is reflected by a lens surface 42a and impinges on a reflective surface 40b adjoining to a reflective surface 40a currently deflecting the beam from the light source 46. Further, the beam deflected by the reflective surface 40b passes through the fθ lens 45 and impinges on the scan target surface S. Consequently, a photoconductive material placed on the scan target surface S is exposed to the beam (ghost beam).

The occurrence of the ghost beam can be prevented by reducing reflectivity of lens surfaces of the fθ lens 45 to zero. However, a lens having very low reflectivity is expensive. The reason is that the lower reflectivity becomes, the higher the number of layers of coatings to be formed on a lens surface becomes. In addition, to reduce reflectivity of a lens surface to completely zero by use of the coatings is impossible.

Japanese Provisional Publication No. HEI 5-346553 discloses a scanning optical system configured to prevent the occurrence of the ghost beam. In this scanning optical system, a lens having a lens surface which has a possibility of reflecting incident beam (i.e., making the ghost beam) is inclined by a predetermined angle in an auxiliary scanning plane (which is defined as a plane including a rotational axis of a polygonal mirror and an optical axis of a scanning lens).

Japanese Provisional Publication No. HEI 7-230051 discloses another scanning optical system configured to prevent the occurrence of ghost beams. In the scanning optical system disclosed in this publication, a lens surface of a scanning lens system is decentered in the auxiliary scanning direction to prevent the occurrence of the ghost beam. A bow (i.e., a curve of a scanning line) caused by the decentering of the lens surface is compensated by decentering another lens surface of the scanning lens system in the auxiliary scanning direction.

Considering the configuration to prevent the ghost beam and the bow using the example of FIG. 9, even if the compensation lens 42 having a lens surface generating the ghost beam is decentered for preventing the ghost image, a bow caused by the decentering of the compensation lens 42 can be compensated by decentering the scanning lens 41.

Configurations to prevent the occurrence of the ghost beam described in the above two publications are useful for a scanning optical system for an apparatus for forming monochrome images such as a monochrome laser beam printer because such an apparatus requires only one scanning beam.

However, the configurations to prevent the occurrence of ghost beams described in the above publications can not be applied to a tandem-type scanning optical system used for an apparatus for generating color images such as a color laser beam printer.

Figure 11:
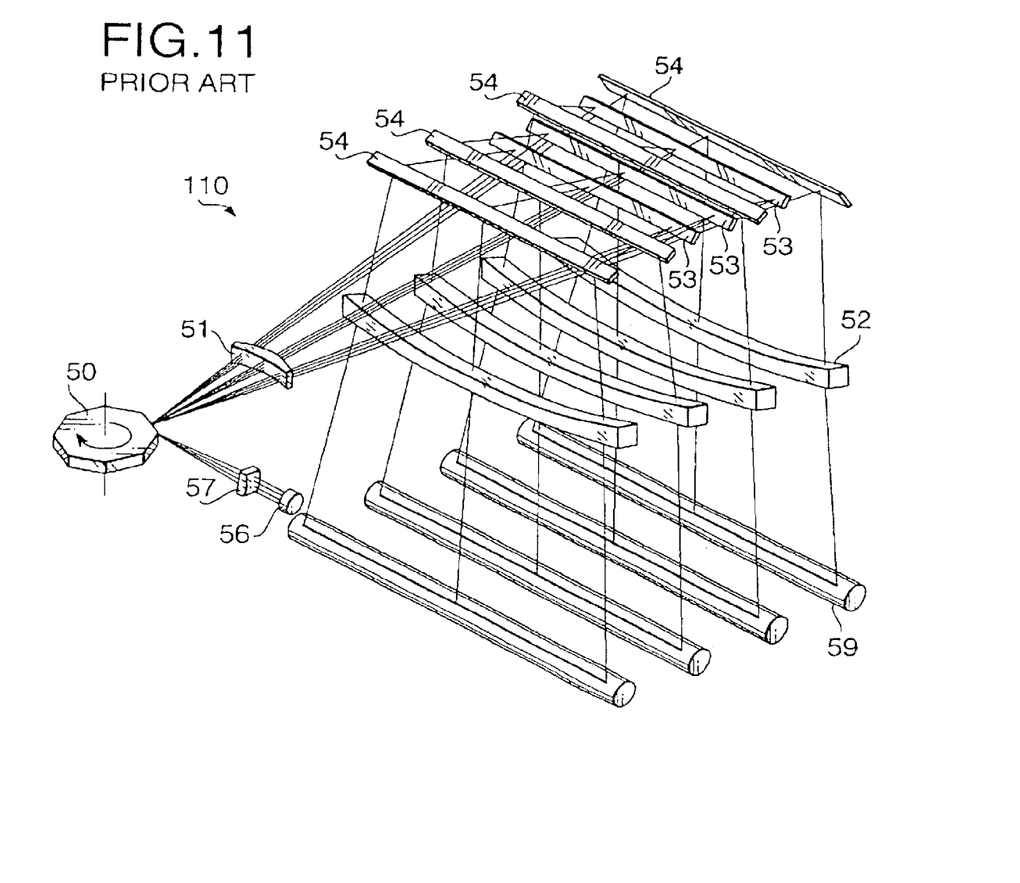
FIG. 11 is a perspective view of a tandem-type scanning optical system.

FIG. 11 is a perspective view of the tandem-type scanning optical system 110. As shown in FIG. 11, the tandem-type scanning optical system 110 includes a light source 56 which emits a plurality of beams respectively corresponding to four color components (yellow, magenta, cyan, and blue), a cylindrical lens 57, a single polygonal mirror 50, a scanning lens 51, and a plurality of compensation lenses 52 respectively provided for the plurality of beams.

The beams emitted by the light source 56 are converged by the cylindrical lens 57 to a point on a reflective surface of the polygonal mirror 50. As shown in FIG. 11, the beams emerged from the cylindrical lens 57 are incident on the polygonal mirror 50 with incident angles of the beams with respect to the reflective surface in the auxiliary scanning direction being different from each other.

The polygonal mirror 50 simultaneously deflects the beams incident thereon to scan in the main scanning direction. The beams deflected by the polygonal mirror 50 proceed in directions different from each other in the auxiliary scanning direction and pass through the scanning lens 51.

Each beam emerged from the scanning lens 51 is bended by a corresponding mirror group consisting of a pair of mirrors 53 and 54 or consisting of a mirror 54, and passes through the corresponding-compensations lens 52. The beams emerged from the compensation lenses 52 impinge on photoconductive drums 59, respectively, to from latent images on the photoconductive drums 59. With this structure, latent images having respective color components are formed on the photoconductive drums 59.

If one of lens surfaces of the compensation lenses 52 causes a ghost beam, it is required to decenter the lens surface causing the ghost beam or the compensation lens 52 in order to prevent the occurrence of the ghost beam. Although the occurrence of the ghost beam is prevented by decentering the lens surface of the compensation lens 52 or decentering the compensation lens 52, it is impossible to decenter the scanning lens 51 to prevent a bow caused by the decentering of the lens surface of the compensation lens 52 or the decentering of the compensation lens 52. The reason is that if the scanning lens 51 is decentered to compensate for the bow cased by one of beams passing through the scanning lens 51, the decentering of the scanning lens 51 affects the other beams which do not cause the ghost beam and therefore performance of the tandem-type scanning optical system 110 is deteriorated.

In a case where one lens (hereafter, a first lens) is decentered to compensate for a bow caused by the decentering of a lens surface of another lens, the decentering amount of the first lens required to compensate for the bow depends on the shapes of lens surfaces of the first lens. Therefore, there may be a case where a decentering amount of the first lens required to compensate for the bow becomes too great and thereby manufacturing process of the first lens becomes very difficult. In addition, there may be a case where the bow caused by the decentering of the lens surface of another lens can not be sufficiently compensated by the decentering of the first lens.

SUMMARY OF THE INVENTION

The present invention is advantageous in that it provides a scanning optical system which enables to prevent an occurrence of a ghost beam caused by a lens surface of an imaging optical system of the scanning optical system and to compensate for a bow without decentering another lens surface of the imaging optical system.

According to an aspect of the present invention, there is provided a scanning optical system for emitting a plurality of beams scanning in a main scanning direction. The scanning optical system is provided with a light source that emits the plurality of beams, a deflector that simultaneously deflects the plurality of beams incident thereon to scan in the main scanning direction, incident angles of the plurality of beams with respect to the deflector being different from each other in an auxiliary scanning direction which is perpendicular to the main scanning direction, and an imaging optical system that converges the plurality of beams deflected by the deflector to form a plurality of beam spots scanning on respective scan target surfaces in the main scanning direction.

In this configuration, the imaging optical system has a first lens group though which all of the beams deflected by the deflector pass, and a plurality of second lens groups respectively provided for the plurality of beams, each of the plurality of beams emerged from the first lens passing through corresponding one of the plurality of second lens groups. Further, each of the plurality of second lens groups has a lens surface whose optical surface reference axis is tilted with respect to an optical surface reference axis of the first lens group so that a beam reflected by the lens surface is not incident on the deflector, and at least one of lens surfaces of each of the plurality of second lens groups except the lens surface tilted with respect to the optical surface reference axis of the first lens group is formed to be an aspherical surface defined by a two-dimensional polynomial expression.

With the above configuration, the occurrence of the ghost beam is prevented while the bow caused by the inclination of the lens surface can be compensated by the aspherical surface defined by the two-dimensional polynomial expression.

In a particular case, optical power of the at least one of lens surfaces formed to be the aspherical surface defined by the two-dimensional polynomial expression may be greater than that of the lens surface tilted with respect to the optical surface reference axis of the first lens group in the auxiliary scanning direction.

Optionally, each of the second lens groups may have a single lens, one lens surface of the single lens being the lens surface tilted with respect to the optical surface reference axis of the first lens group, the other lens surface of the single lens being the aspherical surface defined by the two-dimensional polynomial expression.

Still optionally, optical power of the one lens surface of the single lens and optical power of the other lens surface of the single lens may be substantially equal to each other in the auxiliary scanning direction.

Still optionally, the single lens may be a compensation lens compensating for curvature of field.

Still optionally, the at least one of lens surfaces formed to be the aspherical surface defined by the two-dimensional polynomial expression may compensate for a bow of a scan line caused by tilting the optical surface reference axis of the lens surface with respect to the optical surface reference axis of the first lens group.

In a particular case, the first lens group may have a scanning lens, and the second lens groups may have compensation lenses respectively provided for the plurality of beams, each compensation lens compensating for curvature of field.

In a particular case, the optical surface reference axis of the lens surface tilted with respect to an optical surface reference axis of the first lens group may coincide with the optical surface reference axis of the at least one of lens surfaces formed to be the aspherical surface defined by a two-dimensional polynomial expression.

DETAILED DESCRIPTION OF THE EMBODIMENTS

Hereinafter, an embodiment according to the invention is described with reference to the accompanying drawings.

Figure 1:
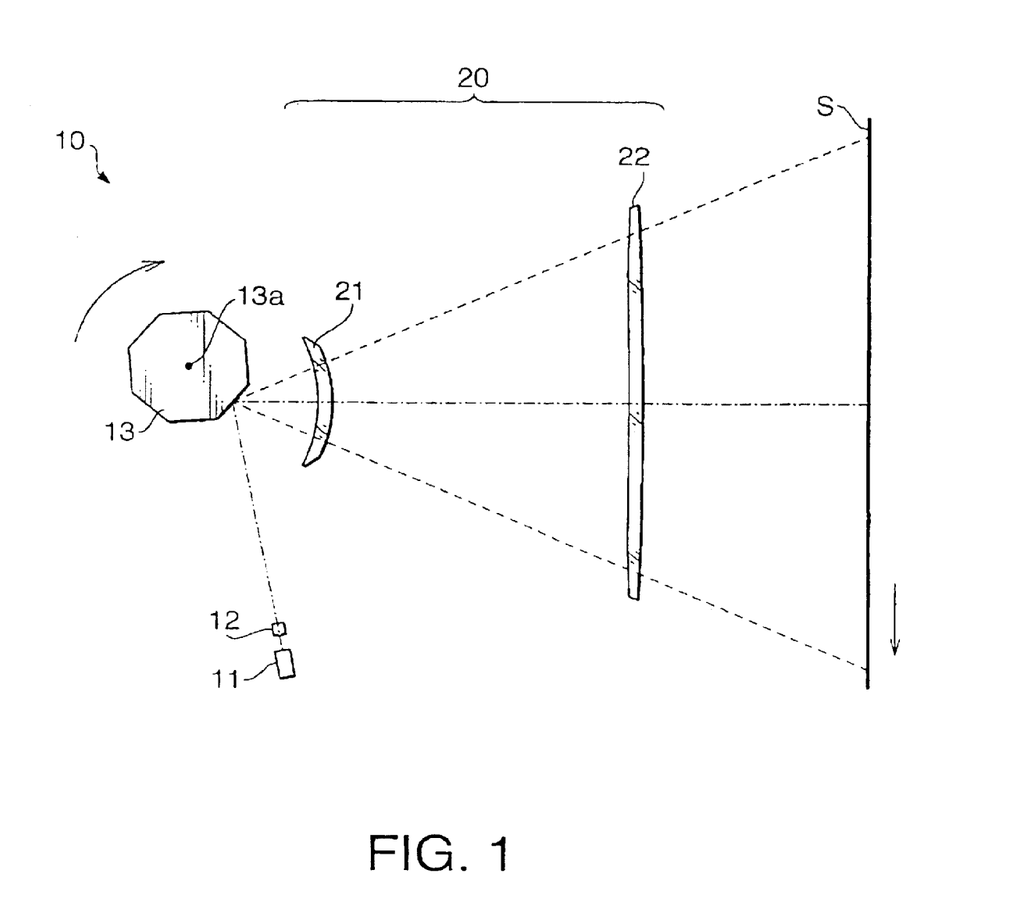
FIG. 1 is a developed view of a scanning optical system according to an embodiment of the present invention viewed along a line parallel with a rotational axis of a polygonal mirror.
Figure 2:
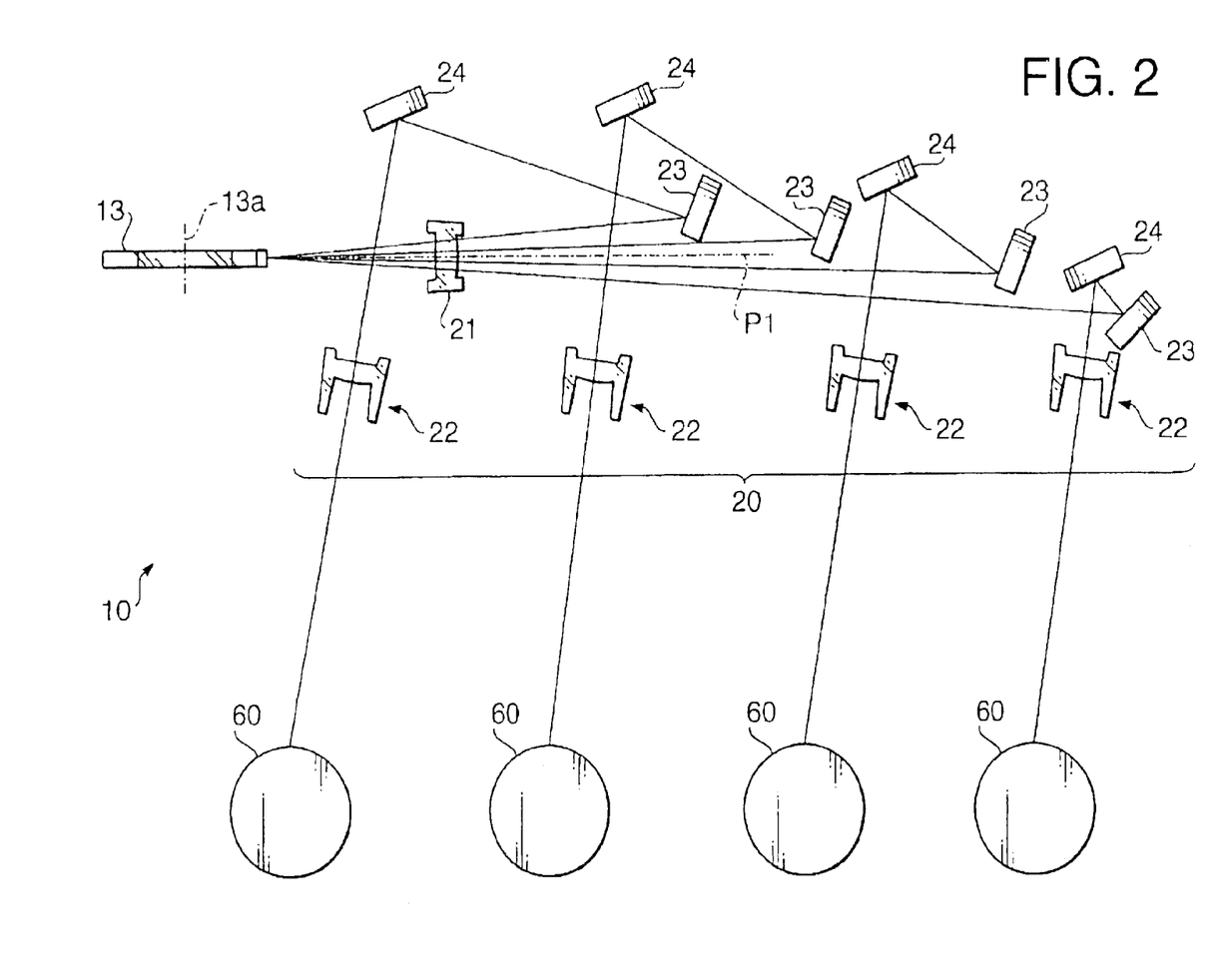
FIG. 2 is a side view of the scanning optical system shown in FIG. 1.

FIG. 1 is a developed view of a scanning optical system 10 viewed along a line parallel with a rotational axis 13a of a polygonal mirror 13. FIG. 2 is a side view of the scanning optical system 10. As shown in FIGS. 1 and 2, the scanning optical system 10 is a so-called tandem type scanning optical system used for an apparatus for forming color images such as a color laser beam printer.

As described below, the scanning optical system 10 is configured to simultaneously deflect a plurality of beams using the single polygonal mirror 13 and to form a plurality of beam spots: scanning on respective photoconductive drums 60. The photoconductive drums 60 correspond to color components of cyan, magenta, yellow and black, respectively. In FIG. 1, only optical components related to one color component are indicated for the sake of simplicity.

As shown in FIG. 1, the scanning optical system 10 includes a laser source 11 which emits the plurality beams, a cylindrical lens 12, the polygonal mirror 13, and an fθ lens 20.

Each beam emitted by the laser source is collimated by a collimator lens (not shown) located between the light source 11 and the cylindrical lens 12 and then passes through the cylindrical lens 12. The cylindrical lens 12 converges the beams in the auxiliary scanning direction which is parallel with the rotational axis 13a of the polygonal mirror 13 to form line-like images extending in the main scanning direction in the vicinity of a reflective surface of the polygonal mirror 13.

By rotating the polygonal mirror 13 about its rotational axis 13a, the beams incident on the reflective surface of the polygonal mirror are simultaneously deflected within a predetermined angular range. The fθ lens 20 converges the deflected beams on to photoconductive drums 60, respectively, and forms beam spots scanning in the main scanning direction at constant speed on the photoconductive drums 60, respectively.

As described above, with regard to the main scanning direction, the beam emitted by the laser source 11 is not converged when the beam is incident on the polygonal mirror, and the beam deflected by the polygonal mirror 13 is converged by the fθ lens 20 in the main scanning direction onto the photoconductive drum 60.

With regard to the auxiliary scanning direction, the beam emitted by the laser source 11 is converged by the cylindrical lens 12 onto the reflective surface of the polygonal mirror. Then, the beam deflected by the polygonal mirror 13 proceeds toward the fθ lens 20 as a divergent beam and converged by the fθ lens 20 onto the photoconductive drum (the scan target surface S).

That is, the reflective surface of the polygon mirror 13 and the scan target surface S are set optically conjugate with each other with regard to the auxiliary scanning direction. Therefore, deviation of scanning position on the scan target surface S in the auxiliary scanning direction caused by slight tilting (the so called "facet error") of each reflective surface of the polygon mirror 13 is corrected and eliminated.

As shown in FIG. 2, the fθ lens 20 has a first lens group which consists of a single scanning lens 21, and a second lens group which consists of a plurality of compensation lenses 22 respectively provided for the photoconductive drums 60.

The scanning lens 21 has power principally in the main scanning direction. The compensation lens 22 has power principally in the auxiliary scanning direction and has the function of compensating for curvature of field. Optical axes of the scanning lens 21 and the compensation lens 22 are coaxial with each other in the main scanning direction. Further, the optical axis of the scanning lens 21 is substantially coaxial with an optical path of the beam when the beam is reflected by the reflective surface at a center position of the reflective surface.

The compensation lens 22 has a rear surface (a scan target surface side surface) whose optical power in the auxiliary scanning direction is relatively small. Such a lens surface having relatively low power in the auxiliary scanning direction may cause the ghost beam. For this reason, the optical axis of the compensation lens 22 is tilted in the auxiliary scanning direction with respect to the optical axis of the scanning lens 21.

More specifically, an optical reference axis of the rear surface of the compensation lens 22 is tilted with respect to the optical axis of the scanning lens 21 so that a beam reflected from the rear surface of the compensation lens 22 does not impinge the polygonal mirror 13 again through the scanning lens 21.

When a beam emerged from the cylindrical lens 12 impinges on the reflective surface of the polygonal mirror 13 at the center position of the reflective surface, a point of intersection of an axis of the beam and the reflective surface is referred to as a deflection point.

In this embodiment, there is a case where a lens surface of the imaging optical system (the fθ lens 20) is formed as a rotationally asymmetrical surface ("two-dimensional polynomial aspherical surface"). Such a rotationally asymmetrical optical surface does not have an axis like a symmetry axis of a rotationally symmetrical optical surface. Therefore, a term "optical surface reference axis" is defined here as an axis passing through the "origin" that is set when the shape of the optical surface is described in a mathematical expression, and the "optical surface reference axis" will be regarded as one that corresponds to the symmetry axis of a rotationally symmetrical optical surface (i.e., the optical axis).

In this embodiment, a main scanning plane is defined as a plane which includes the optical axis of the scanning lens 21 and is perpendicular to the rotational axis 13a of the polygonal mirror 13. An auxiliary scanning plane is defined as a plane which includes the optical axis of the scanning lens 21 and is perpendicular to the main scanning plane. The scan target surface S corresponds to a photoconductive surface of the photoconductive drum 60.

The laser source 11 and the compensation lens 22 are provided in the scanning optical system 10 for each of color components of yellow, magenta, cyan and black.

FIG. 2 shows actual positions of the optical elements from the polygonal mirror 13 through the photoconductive drums 60. Four laser beams proceeding from four laser sources 11 to the cylindrical lens 12 are parallel with each other. The four beams are then converged by the cylindrical lens 12 in the auxiliary scanning direction, so that incident angles of the four beams with respect to the reflective surface of the polygonal mirror 13 are different from each other in the auxiliary scanning direction. The four beams are simultaneously deflected by the polygonal mirror 13.

The four beams deflected by the polygonal mirror 13 proceed to the scanning lens 21 with angles which the four beams form with respect to the optical axis P1 of the scanning lens 21 being different from each other. As shown in FIG. 2, all of the four beams pass through the scanning lens 21.

The four beams emerged from the scanning lens 21 pass through the compensation lenses 22, respectively. Finally, the four beams are incident on the photoconductive drums 60, respectively. For the purpose of reducing size of the scanning optical system 10, each beam between the scanning lens 21 and the compensation lens 22 is bended by a pair of mirrors 23 and 24.

Four pairs of the mirrors 23 and 24 are located so that four optical paths between the scanning lens 21 and the respective photoconductive drums 60 become equal to each other. Further, distances between the compensation lenses 22 and the respective photoconductive drums 60 are equal to each other.

Since, in addition to equality of the optical paths of the four beams, wavelengths of the four beams are equal to each other, optical effects of the scanning lens 21 on the four beams are equal to each other.

In the color laser printer which employs the scanning optical system 10, each beam incident on the corresponding photoconductive drum is modulated according to image data while each photoconductive drum rotates about its rotational axis. Consequently, two dimensional latent images are formed on the photoconductive drums, respectively.

Next, in the color laser printer, toner of the four color cComponents are electrostatically adsorbed by the photoconductive drums, respectively. Consequently, toner images having color components of black, cyan, yellow and magenta are formed on the photoconductive drums, respectively. The four toner images (four color image components) are then printed, in an overlaid fashion, on the same sheet.

Hereafter, two concrete examples according to the embodiment of the present invention will be described.

The examples are configured to prevent the occurrence of the ghost beam caused by undesired reflections on the rear lens surface of the compensation lens 22 and to compensate for a bow caused by the rear surface of the compensation lens 22 without decentering any optical element other than the compensation lens 22.

It should be noted that the shapes of lens surfaces of compensation lens 22 are not decentered with respect to a lens frame of the compensation lens 22. Therefore, the inclination of lens surfaces of the compensation lens 22 with respect to the optical axis of the scanning lens 21 is made by a worker when the compensation lens 22 is fixed to a frame (not shown) of the scanning optical system 10.

FIRST EXAMPLE

Figure 3:
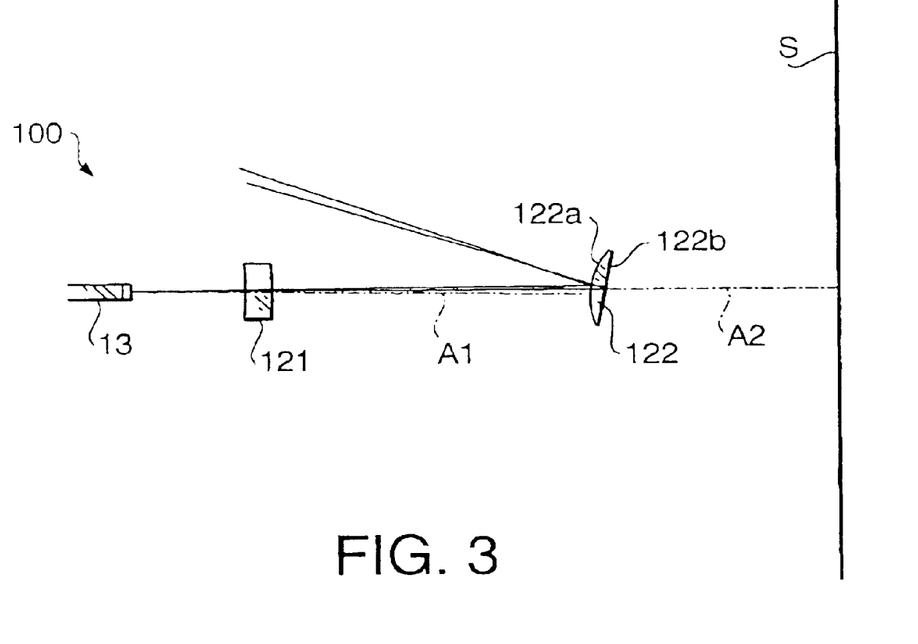
FIG. 3 is a side view of a scanning optical system according to a first example illustrating an undesired beam reflected from a rear surface of a compensation lens.
Figure 4:
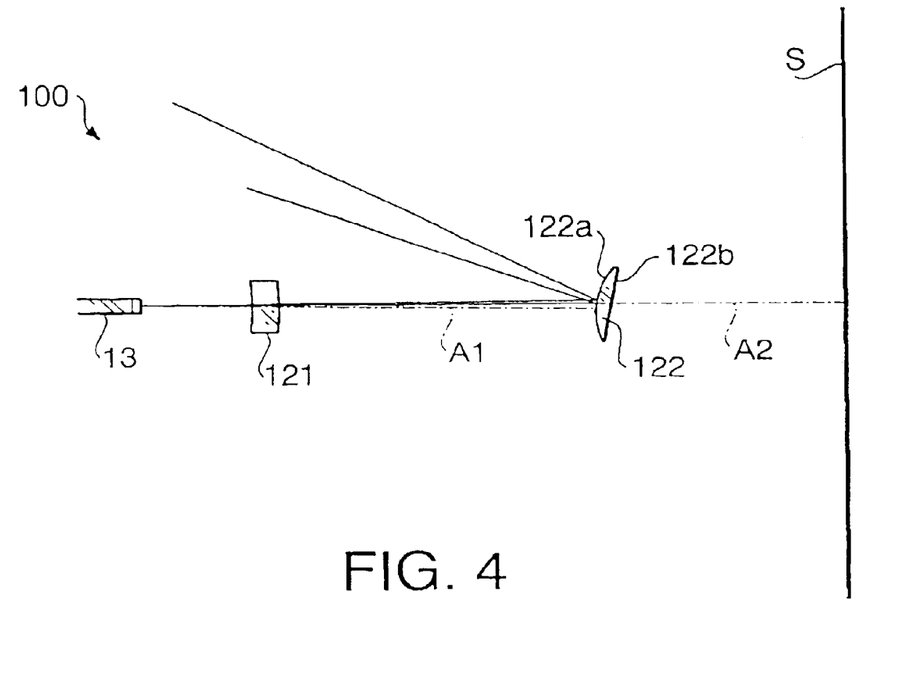
FIG. 4 is a side view of the scanning optical system of the first example illustrating an undesired beam reflected from a front surface of the compensation lens.

Each of FIGS. 3 and 4 is a developed view of a scanning optical system 100 according to a first example viewed along a line parallel with the main scanning direction. In FIGS. 3 and 4, to elements which are the same as those in FIG. 1, the same reference numbers are assigned, and the detailed description thereof will not be repeated.

In FIGS. 3 and 4, a chain line A1 indicates an optical surface reference axis of the scanning lens 21. A chain line A2 corresponds to a line translated by a certain distance with respect to the chain line A1. In FIGS. 3 and 4, a regular beam being incident on the scan target S is omitted for the sake of simplicity, and only undesired beams reflected from lens surfaces of a compensation lens 122 are shown.

In the first example, a rear surface 122b of the compensation lens 22 is a rotationally symmetrical surface. The optical surface reference axis of the rear surface 122b is tilted by −10° in the auxiliary scanning direction with respect to the optical axis A1. In other words, the rear surface 122b is decentered with respect to the optical axis A1. In this specification, when the lens surface is tilted clockwise, the tilt angle is assigned a minus sign, and when the lens surface is tilted counterclockwise, the tilt angle is assigned a plus sign.

With this structure, as shown in FIG. 3, an undesired beam reflected from the rear surface 122b of the compensation lens 122 passes the outside of the scanning lens 121 and is not incident on the polygonal mirror 13.

A front surface 122a of the compensation lens 122 is formed to be an aspherical surface defined by a two-dimensional polynomial expression to compensate for a bow caused by the inclination of the rear surface 122b. Since the front surface 122a has relatively strong power in the auxiliary scanning direction, an undesired beam reflected from the front surface 122a is deflected significantly in the auxiliary scanning direction. Consequently, the undesired beam passes the outside of the scanning lens 121 and in not incident on the polygonal mirror 13 (see FIG. 4).

In the first example, a focal length of the entire fθ lens 20 including the scanning lens 121 and the compensation lens 122 is 200.0 mm, and a scanning width by which the beam spot scans on the scan target surface S is 216 mm. A design wavelength of the beam is 780 nm.

A deflection angle defined as an angle which the beam incident on the polygonal mirror 13 forms with respect to the optical axis of the scanning lens 121 in the main scanning plane is −65°. When the beam is tilted clockwise with respect to the optical axis of the scanning lens 121 in the main scanning plane, the deflection angle is assigned a minus sign. When the beam is tilted counterclockwise with respect to the optical axis of the scanning lens 121 in the main scanning plane, the deflection angle is assigned a plus sign.

An incident angle of the beam (which causes the undesired beams shown in FIGS. 3 and 4) with respect to the reflective surface of the polygonal mirror is −0.95° in the auxiliary scanning direction. This incident angle is assigned a minus sign when the beam reflected by the reflective surface of the polygonal mirror is tilted clockwise with respect to the optical axis of the scanning lens 121 in the auxiliary scanning plane. This incident angle is assigned a plus sign when the beam reflected by the reflective surface of the polygonal mirror is inclined counterclockwise with respect to the optical axis of the scanning lens 121 in the auxiliary scanning plane.

TABLE 1 shows a concrete numerical configuration of the first example from the cylindrical lens 12 through the scan target surface S. In TABLE 1, for the lens surfaces of the compensation lens 22, values with regard to a paraxial ray are indicated.

TABLE 1

| No. | Ry | Rz | D | N | DECZ |
|---|---|---|---|---|---|
| #1 | ∞ | −51.08 | 4.00 | 1.51072 | 0.00 |
| #2 | ∞ | | 97.00 | | 0.00 |
| #3 | ∞ | | 42.00 | | 0.00 |
| #4 | −185.60 | | 10.00 | 1.48617 | 0.00 |
| #5 | −63.00 | −100.00 | 112.50 | | 0.00 |
| #6 | −577.54 | | 5.00 | 1.48617 | 2.50 |
| #7 | −1800.00 | | 82.76 | | 0.00 |
| #8 | ∞ | | 0.00 | | −0.10 |

In TABLE 1, the character "No." indicates surface numbers that are assigned to optical surfaces in the first example starting from a front surface (a beam incident surface) of the cylindrical lens 12. The #1 and #2 denote the front surface and a rear surface (a beam emerging surface) of the cylindrical lens 12, respectively. The #3 denotes the reflective surface of the polygonal mirror 13. The #4 and #5 denote a front surface (a polygonal mirror side) and a rear surface (a scan target surface side) of the scanning lens 121, respectively. The #6 and #7 denote a front surface and a rear surface of the compensation lens 122, respectively. The #8 denotes the scan target surface S.

The character "Ry" denotes a radius of curvature [mm] of each optical surface on its optical axis measured in the main scanning direction, and "Rz" denotes a radius of curvature [mm] of each optical surface on its optical axis measured in the auxiliary scanning direction. The character "d" denotes the distance [mm] between the optical surface and the next optical surface measured along the optical axis, and "N" denotes a refractive index of each lens at a design wavelength 780 nm.

"DECZ" denotes a decentering amount (unit: mm) of each surface when the scanning optical system 100 is developed. The decentering amount "DECZ" is a distance between an optical surface reference axis of an optical surface with respect to anterior optical surface. DECZ is assigned a plus sign when an optical element is decentered upward on FIGS. 3 and 4, and is assigned a minus sign when the optical element is decentered downward on FIGS. 3 and 4.

In TABLE 1, when Ry and Rz of a lens surface is equal to each other (i.e., when the lens surface is rotationally symmetrical surface), values of Rz are omitted.

As can be seen from TABLE 1, the front surface of the cylindrical lens 12 is a cylindrical surface, and the rear surface of the cylindrical lens 12 is a flat surface. The front surface of the scanning lens 121 and the rear surface 122b of the compensation lens 122 are rotationally symmetrical surfaces.

The rear surface (#5) of the scanning lens 121 is an anamorphic aspherical surface whose cross section in the main scanning direction is defined by a function of a height from the optical axis in the main scanning direction and whose curvature of a cross section in the auxiliary scanning direction is defined by a function of a height from the optical axis in the main scanning direction.

The anamorphic aspherical surface is defined by following equations.

$$X(Y) = \frac{\left(\frac{1}{Ry}\right)Y^2}{1 + \sqrt{1 - (1-\kappa)^2 Y^2 \left(\frac{1}{Ry}\right)^2}} + AM_1 Y + AM_2 Y^2 + AM_3 Y^3 + AM_4 Y^4 + AM_5 Y^5 + AM_6 Y^6 + AM_7 Y^7 + AM_8 Y^8 \cdots \quad (1)$$

$$\frac{1}{Rz(Y)} = \frac{1}{Rz} + AS_1 Y + AS_2 Y^2 + AS_3 Y^3 + AS_4 Y^4 + AS_5 Y^5 + AS_6 Y^6 + AS_7 Y^7 + AS_8 Y^8 \cdots \quad (2)$$

where X(Y) is a SAG amount which is obtained as a function of a coordinate Y extending in the main scanning direction. The SAG amount X(Y) represents a distance between a plane tangential to the anamorphic aspherical surface at the optical axis and a point on a curved line extending along the anamorphic aspherical surface in the main scanning direction and passing the optical axis thereof. 1/Ry represents curvature of the anamorphic aspherical surface in the main scanning direction at the optical axis. Further, 1/Rz(Y) represents curvature of an arc extending in the auxiliary scanning direction, and the arc is intersecting the curved line at the point whose coordinate is Y. K represents a conical coefficient, and $AM_n$ is an aspherical coefficient of $n^{th}$ order for the main scanning direction. $AS_n$ is an aspherical coefficient of $n^{th}$ order for the auxiliary scanning direction.

Values of the coefficients for the rear surface (#5) of the scanning lens 121 expressed by the equations (1) and (2) are indicated in TABLE 2.

TABLE 2 surface #5 (anamorphic aspherical surface)

| | |
|---|---|
| κ = 0.000 | |
| $AM_1$ = 0.00E+00 | $AS_1$ = 1.11E−05 |
| $AM_2$ = 0.00E+00 | $AS_2$ = 2.23E−06 |
| $AM_3$ = 0.00E+00 | $AS_3$ = 1.89E−08 |
| $AM_4$ = 2.19E−07 | $AS_4$ = −8.32E−09 |
| $AM_5$ = 0.00E+00 | $AS_5$ = −1.51E−11 |
| $AM_6$ = −1.92E−12 | $AS_6$ = 2.49E−12 |
| $AM_7$ = 0.00E+00 | $AS_7$ = 0.00E+00 |
| $AM_8$ = 1.38E−15 | $AS_8$ = 0.00E+00 |
| $AM_9$ = 0.00E+00 | $AS_9$ = 0.00E+00 |
| $AM_{10}$ = −3.29E−18 | $AS_{10}$ = 0.00E+00 |

The front surface 122a (#6) of the compensation lens 122 is an aspherical surface defined by a two-dimensional polynomial expression. The aspherical surface defined by a two-dimensional polynomial expression is expressed by:

$$X(Y, Z) = \frac{\left(\frac{1}{Ry}\right)(Y^2 + Z^2)}{1 + \sqrt{1 - (\kappa + 1)(Y^2 + Z^2)/Ry^2}} + \sum\sum B_{mn} Y^m Z^n \quad (3)$$

where, X(Y,Z) Is a SAG amount which is defined by coordinate axes correspond to the main scanning direction (Y axis) and the auxiliary scanning direction (Z axis).

$X(Y,Z)$ is a distance between a point $(X,Y)$ on the aspherical surface and a plane tangential to the aspherical surface at a center position (an origin point) thereof. $1/Ry$ is curvature in the main scanning direction at the center position. k represents a conical coefficient. $B_{mn}$ is an aspherical coefficient (m is an order as to the main scanning direction, n is an order as to the auxiliary scanning direction).

Values of the coefficients for the aspherical surface defined by the two-dimensional polynomial expression formed on the front surface 122a of the compensation lens 122 are indicated in TABLE 3.

TABLE 3 surface #6

| $B_{mn}$ | n = 0 | n = 1 | n = 2 | n = 3 | n = 4 |
|---|---|---|---|---|---|
| m = 0 | — | 3.28E−02 | 1.86E−02 | 7.06E−06 | −7.10E−07 |
| m = 2 | 5.09E−05 | −4.27E−07 | −4.33E−07 | −6.71E−10 | −8.62E−11 |
| m = 4 | 1.16E−07 | −1.24E−10 | −7.82E−12 | −4.54E−13 | −1.43E−14 |
| m = 6 | −5.26E−12 | 1.48E−14 | 1.69E−15 | −3.08E−19 | 0.00E+00 |
| m = 8 | 1.40E−16 | −6.67E−19 | 0.00E+00 | 0.00E+00 | 0.00E+00 |

The front surface 122a is formed such that an angle formed between a normal to the surface at a point $(Y,Z)$ and the optical axis (i.e. the optical surface reference axis) becomes greater as distance between the point $(Y,Z)$ and the optical axis in the main scanning direction becomes greater.

Figure 5:
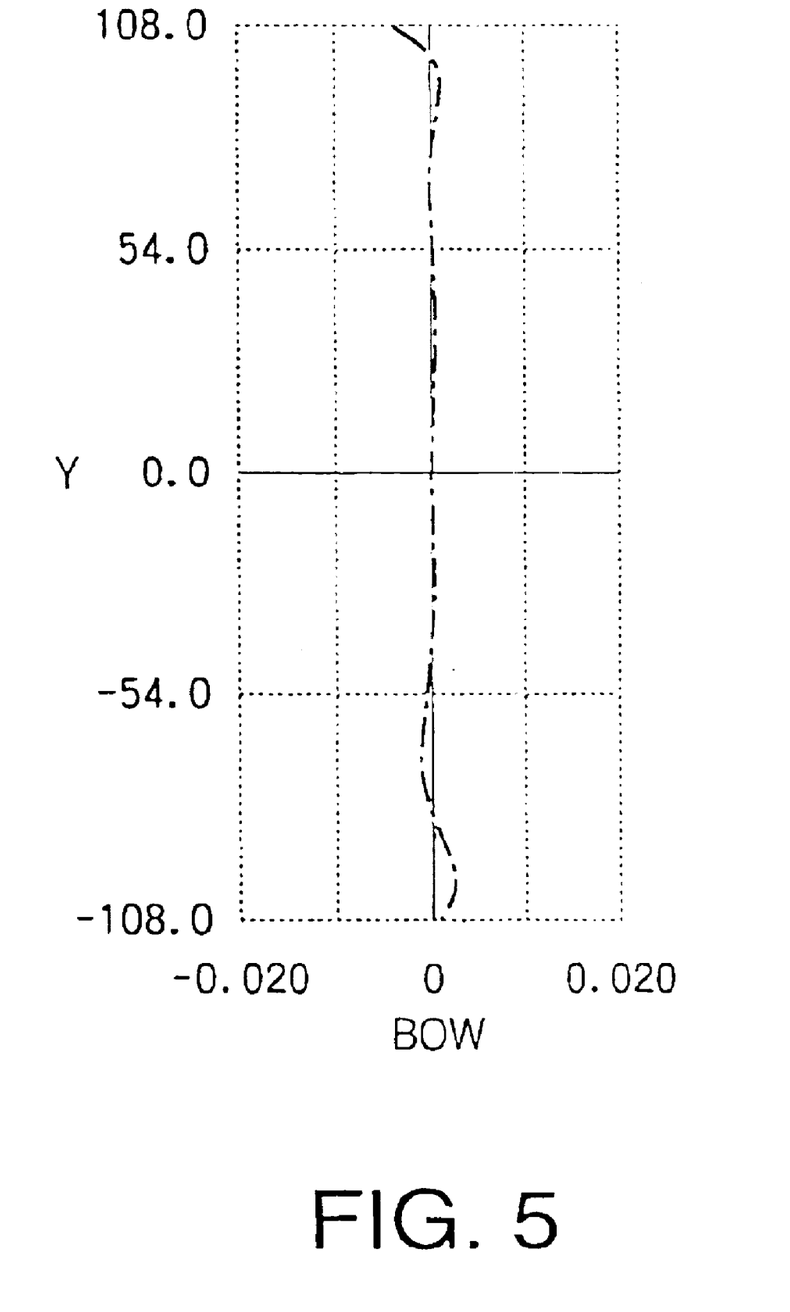
FIG. 5 is a graph illustrating a bow which occurs in the first example.

FIG. 5 is a graph illustrating a bow which occurs in the first example. In FIG. 5, a vertical axis represents an image height Y in the main scanning direction, and a horizontal axis represents a shift amount of a beam spot (unit: mm) in the auxiliary scanning direction with respect to an ideal position. That is, a chain line in FIG. 5 represents a shape of an actual scan line. As can be seen from FIG. 5, according to the scanning optical system 100 of the first example, the bow is sufficiently compensated for.

SECOND EXAMPLE

Figure 6:
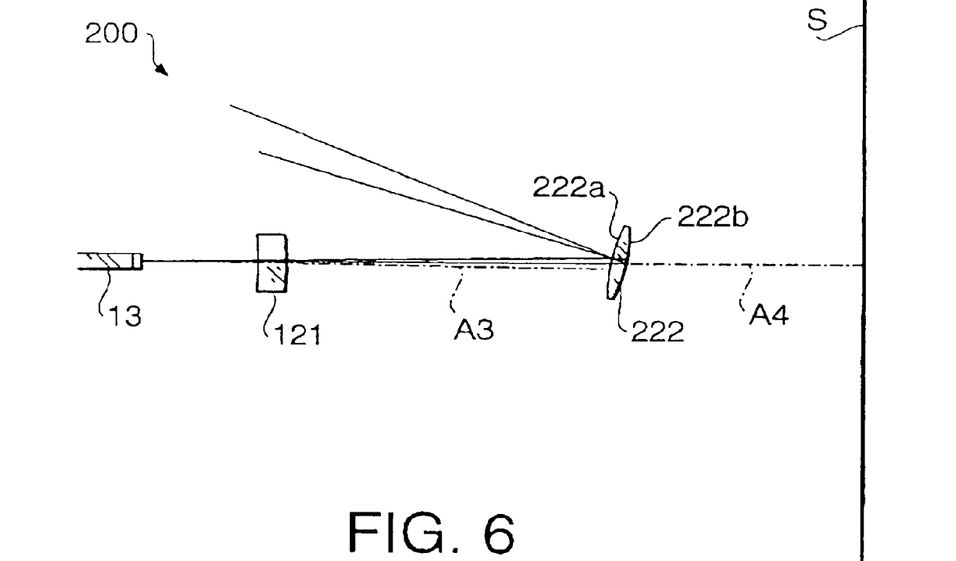
FIG. 6 is a side view of a scanning optical system according to a second example illustrating an undesired beam reflected from a rear surface of a compensation lens.
Figure 7:
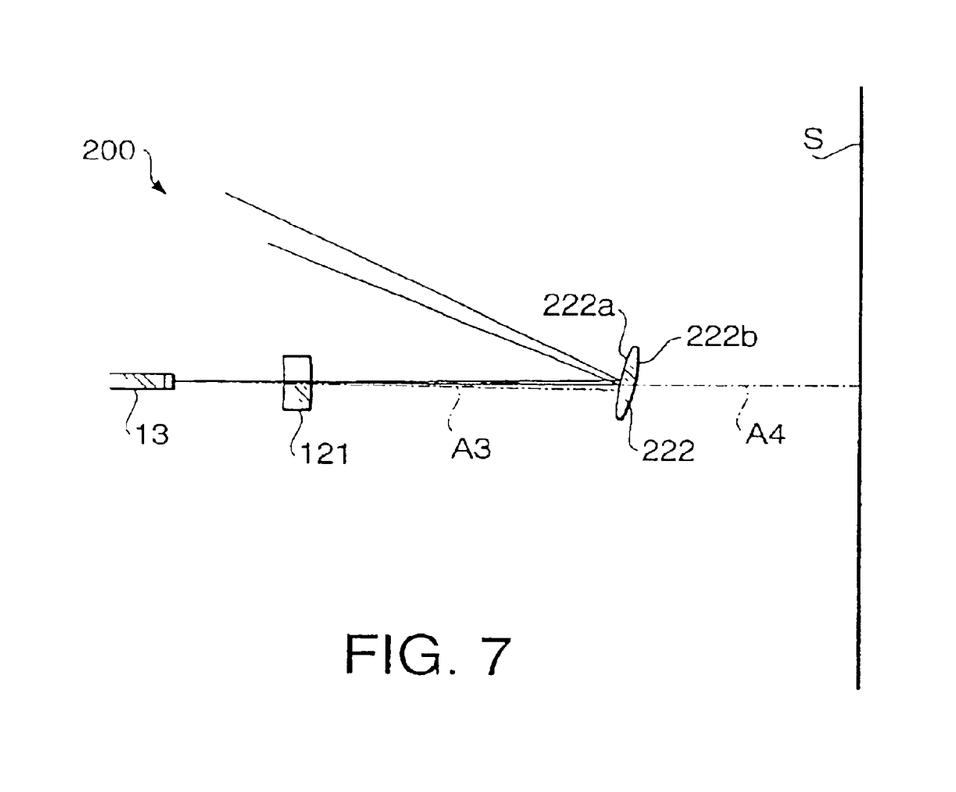
FIG. 7 is a side view the scanning optical system of the first example illustrating an undesired beam reflected from a front surface of the compensation lens.

Each of FIGS. 6 and 7 is a developed view of a scanning optical system 200 according to a second example viewed along a line parallel with the main scanning direction. In FIGS. 6 and 7, to elements which are the same as those in FIG. 1, the same reference numbers are assigned, and the detailed description thereof will not be repeated.

In FIGS. 6 and 7, a chain line A3 indicates an optical surface reference axis of the scanning lens 121. A chain line A4 corresponds to a line translated by a certain distance with respect to the chain line A3. In FIGS. 6 and 7, a regular beam being incident on the scan target S is omitted for the sake of simplicity.

In the second example, a rear surface 222b of a compensation lens 222 is a toric surface. The optical surface reference axis of the rear surface 222b is tilted by −10° in the auxiliary scanning direction. With this structure, as shown in FIG. 6, an undesired beam reflected from the rear surface 222b of the compensation lens 222 passes the outside of the scanning lens 121 and is not incident on the polygonal mirror 13.

A front surface 222a of the compensation lens 222 is formed to be an aspherical surface defined by a two-dimensional polynomial expression to compensate for a bow caused by the inclination of the rear surface 222b. Since the front surface 222a has strong power in the auxiliary scanning direction, an undesired beam reflected by the front surface 222a is deflected significantly in the auxiliary scanning direction. Consequently, the undesired beam passes the outside of the scanning lens 121 and is not incident on the polygonal mirror 13 (see FIG. 7).

In the second example, power of the front surface 222a and the power of the rear surface 222b are substantially equal to each other in the auxiliary scanning direction.

In the second example, a focal length of the entire fθ lens 20 including the scanning lens 121 and the compensation lens 222 is 200.0 mm, and a scanning width is 216 mm. A design wavelength of the beam is 780 nm.

The deflection angle formed between the beam impinging on the polygonal mirror 13 and the optical axis of the scanning lens 121 in the main scanning plane is −65°.

The incident angle of the beam (which causes the undesired beam shown in FIGS. 6 and 7) with respect to the reflective surface of the polygonal mirror is −0.95° in the auxiliary scanning direction.

TABLE 4 shows a concrete numerical configuration of the second example from the cylindrical lens 12 through the scan target surface S. All symbols and fields in TABLE 4 have the same meanings as those of TABLE 1.

TABLE 4

| No. | Ry | Rz | d | N | DECZ |
|---|---|---|---|---|---|
| #1 | ∞ | −51.08 | 4.00 | 1.51072 | 0.00 |
| #2 | ∞ | | 97.00 | | 0.00 |
| #3 | ∞ | | 42.00 | | 0.00 |
| #4 | −185.60 | | 10.00 | 1.48617 | 0.00 |
| #5 | −63.00 | −100.00 | 112.50 | | 0.00 |
| #6 | −577.54 | | 5.00 | 1.48617 | 2.50 |
| #7 | −1800.00 | −55.00 | 82.76 | | 0.00 |
| #8 | ∞ | | 0.00 | | −0.10 |

As can be seen from TABLE 4, the front surface of the cylindrical lens 12 is a cylindrical surface, and the rear surface of the cylindrical lens 12 is a flat surface. The front surface of the scanning lens 121 is a rotationally symmetrical surfaces. The rear surface 222b of the compensation lens 222 is a toric surface.

The rear surface (#5) of the scanning lens 121 is an anamorphic aspherical surface defined by the equations (1) and (2). Values of the coefficients for the rear surface (#5) of the scanning lens 121 expressed by the equations (1) and (2) are indicated in TABLE 5.

TABLE 5 surface #5 (anamorphic aspherical surface)

| κ = 0.000 | |
|---|---|
| $AM_1$ = 0.00E+00 | $AS_1$ = 1.11E−05 |
| $AM_2$ = 0.00E+00 | $AS_2$ = 2.23E−06 |
| $AM_3$ = 0.00E+00 | $AS_3$ = 1.89E−08 |
| $AM_4$ = 2.19E−07 | $AS_4$ = −8.32E−09 |
| $AM_5$ = 0.00E+00 | $AS_5$ = −1.51E−11 |
| $AM_6$ = −1.92E−12 | $AS_6$ = 2.49E−12 |
| $AM_7$ = 0.00E+00 | $AS_7$ = 0.00E+00 |
| $AM_8$ = 1.38E−15 | $AS_8$ = 0.00E+00 |
| $AM_9$ = 0.00E+00 | $AS_9$ = 0.00E+00 |
| $AM_{10}$ = −3.29E−18 | $AS_{10}$ = 0.00E+00 |

The front surface 222a of the compensation lens 222 is an aspherical surface dfined by the two-dimensional polynomial expression (3). Values of the coefficients for the aspherical surface defined by the two-dimensional polynomial expression formed on the front surface 222a of the compensation lens 222 are indicated in TABLE 6.

TABLE 6 surface #6

| $B_{mn}$ | n = 0 | n = 1 | n = 2 | n = 3 | n = 4 |
|---|---|---|---|---|---|
| m = 0 | — | 2.08E-01 | 3.83E-03 | 2.86E-05 | -8.40E-07 |
| m = 2 | 4.39E-05 | 1.62E-06 | -4.52E-07 | 3.87E-09 | -9.99E-11 |
| m = 4 | 1.17E-07 | -5.42E-10 | -5.91E-12 | -1.85E-13 | -1.55E-14 |
| m = 6 | -5.22E-12 | 3.63E-14 | 6.90E-16 | -1.65E-17 | -2.30E-19 |
| m = 8 | 1.35E-16 | -6.38E-19 | 0.00E+00 | 0.00E+00 | 0.00E+00 |

The front surface 222a is formed such that an angle formed between a normal to the surface at a point (Y,Z) and the optical axis (i.e., the optical surface reference axis) becomes greater as distance between the point (Y,Z) and the optical axis in the main scanning direction becomes greater.

Figure 8:
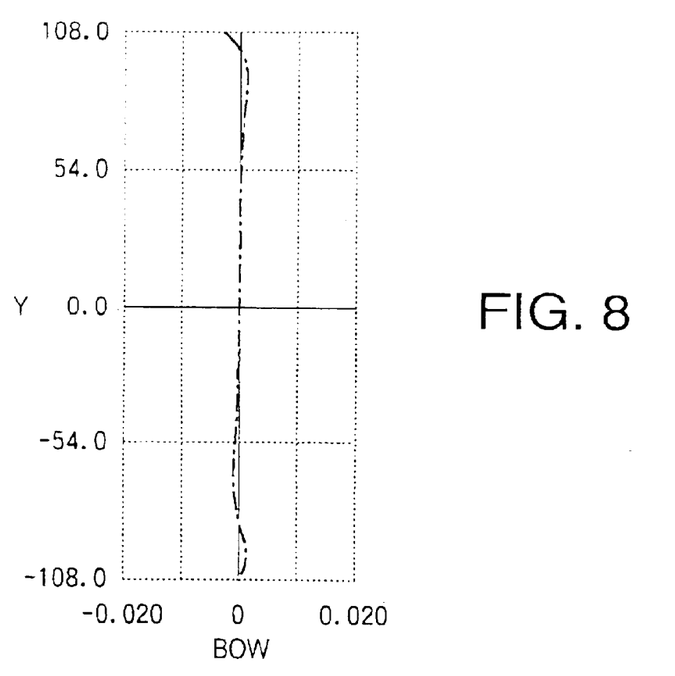
FIG. 8 is a graph illustrating a bow which occurs in the first example.

FIG. 8 is a graph illustrating a bow which occurs in the second example. In FIG. 8, a vertical axis and a horizontal axis have the same meanings as those of FIG. 5. As can be seen from FIG. 8, according to the scanning optical system 200 of the second example, the bow is sufficiently compensated for.

As described above, according to the invention, it is possible to prevent the occurrence of the ghost beam by decenterring a lens surface of a lens (a first lens) which causes the ghost beam and to compensate for a bow caused by the decenterring of the lens surface of the lens without decentering another lens in the imaging optical system.

Although the present invention has been described in considerable detail with reference to a certain preferred embodiment thereof, other embodiments are possible.

The present disclosure relates to the subject matter contained in Japanese Patent Application No. P2002-320688, filed on Nov. 5, 2002, which is expressly incorporated herein by reference in its entirety.

What is claimed is:

1. A scanning optical system for emitting a plurality of beams scanning in a main scanning direction, comprising:
   a light source that emits the plurality of beams;
   a deflector that simultaneously deflects the plurality of beams incident thereon to scan in the main scanning direction, incident angles of the plurality of beams with respect to said deflector being different from each other in an auxiliary scanning direction which is perpendicular to the main scanning direction; and
   an imaging optical system that converges the plurality of beams deflected by said deflector to form a plurality of beam spots scanning on respective scan target surfaces in the main scanning direction,
   wherein said imaging optical system has:
   a first lens group though which all of the beams deflected by said deflector pass; and
   a plurality of second lens groups respectively provided for the plurality of beams, each of the plurality of beams emerged from said first lens passing through corresponding one of said plurality of second lens groups,
   wherein each of said plurality of second lens groups has a lens surface whose optical surface reference axis is tilted with respect to an optical surface reference axis of said first lens group so that a beam reflected by the lens surface is not incident on said deflector,
   wherein at least one of lens surfaces of each of said plurality of second lens groups except the lens surface tilted with respect to the optical surface reference axis of said first lens group is formed to be an aspherical, surface defined by a two-dimensional polynomial expression.

2. The scanning optical system according to claim 1, wherein optical power of the at least one of lens surfaces formed to be the aspherical surface defined by the two-dimensional polynomial expression is greater than that of the lens surface tilted with respect to the optical surface reference axis of said first lens group in the auxiliary scanning direction.

3. The scanning optical system according to claim 1, wherein each of said second lens groups has a single lens, one lens surface of the single lens being the lens surface tilted with respect to the optical surface reference axis of said first lens group, the other lens surface of the single lens being the aspherical surface defined by the two-dimensional polynomial expression.

4. The scanning optical system according to claim 3, wherein optical power of the one lens surface of the single lens and optical power of the other lens surface of the single lens are substantially equal to each other in the auxiliary scanning direction.

5. The scanning optical system according to claim 3, wherein the single lens is a compensation lens compensating for curvature of field.

6. The scanning optical system according to claim 1, wherein the at least one of lens surfaces formed to be the aspherical surface defined by the two-dimensional polynomial expression compensates for a bow of a scan line caused by tilting the optical surface reference axis of the lens surface with respect to the optical surface reference axis of said first lens group.

7. The scanning optical system according to claim 1, wherein said first lens group has a scanning lens, and wherein said second lens groups has compensation lenses respectively provided for the plurality of beams, each compensation lens compensating for curvature of field.

8. The scanning optical system according to claim 1, wherein the optical surface reference axis of the lens surface tilted with respect to an optical surface reference axis of said first lens group coincides with the optical surface reference axis of the at least one of lens surfaces formed to be the aspherical surface defined by a two-dimensional polynomial expression.

* * * * *